US007431365B2

United States Patent
Sturt et al.

(10) Patent No.: US 7,431,365 B2
(45) Date of Patent: Oct. 7, 2008

(54) CONSOLE ASSEMBLY FOR A VEHICLE

(75) Inventors: Alan Sturt, West Bloomfield, MI (US); Jason Gamache, Romeo, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 6 days.

(21) Appl. No.: 11/162,921

(22) Filed: Sep. 28, 2005

(65) Prior Publication Data

US 2007/0069544 A1    Mar. 29, 2007

(51) Int. Cl.
*B60N 3/12*    (2006.01)
(52) U.S. Cl. ............. 296/24.34; 296/208; 224/539
(58) Field of Classification Search ........... 296/37.8, 296/24.34; 224/400, 275, 539
See application file for complete search history.

(56) References Cited

U.S. PATENT DOCUMENTS

| | | | |
|---|---|---|---|
| 5,390,976 A | 2/1995 | Doughty et al. | |
| 5,647,652 A | 7/1997 | Zalewski et al. | |
| 5,845,965 A | 12/1998 | Heath et al. | |
| 5,921,610 A | 7/1999 | Grimes | |
| 5,979,987 A | 11/1999 | Rich | |
| 6,003,927 A | 12/1999 | Körber et al. | |
| 6,032,587 A | 3/2000 | Salenbauch et al. | |
| 6,139,096 A | 10/2000 | Anderson et al. | |
| 6,347,590 B1 | 2/2002 | D'Anunzio et al. | |
| 6,588,821 B2 | 7/2003 | Worrell et al. | |
| 6,663,155 B1 * | 12/2003 | Malone et al. | 296/37.8 |
| 6,702,352 B2 | 3/2004 | Nakanishi et al. | |
| 6,719,343 B2 | 4/2004 | Emerling | |
| 6,719,367 B2 | 4/2004 | Mic et al. | |
| 6,746,055 B1 | 6/2004 | Wood et al. | |
| 6,932,402 B2 | 8/2005 | Niwa et al. | |
| 2002/0175531 A1 | 11/2002 | Worrell et al. | |
| 2003/0098589 A1 | 5/2003 | Wikman et al. | |
| 2003/0122392 A1 | 7/2003 | Larsen et al. | |
| 2003/0155786 A1 | 8/2003 | Kim et al. | |
| 2004/0217625 A1 | 11/2004 | Lindstrome et al. | |
| 2004/0245796 A1 * | 12/2004 | Maierholzner | 296/37.8 |

* cited by examiner

*Primary Examiner*—Joseph D Pape
(74) *Attorney, Agent, or Firm*—Brooks Kushman P.C.

(57) ABSTRACT

A console assembly for use in a passenger seating area of a vehicle includes a console housing having a storage area defined therein. An armrest is pivotally connected to the console housing and is movable between a first position extending at least partially over a top surface of the console housing and at least one second position. The armrest includes a closeout section, a receiving portion operatively connected to the closeout section and a console lid slidably connected to the receiving portion. A console accessory tray is adjustably positioned adjacent the console housing between a stored position and a deployed position extending rearward of the console housing. The console accessory tray includes a display surface accessible to occupants in a rear portion of the passenger seating area.

16 Claims, 4 Drawing Sheets

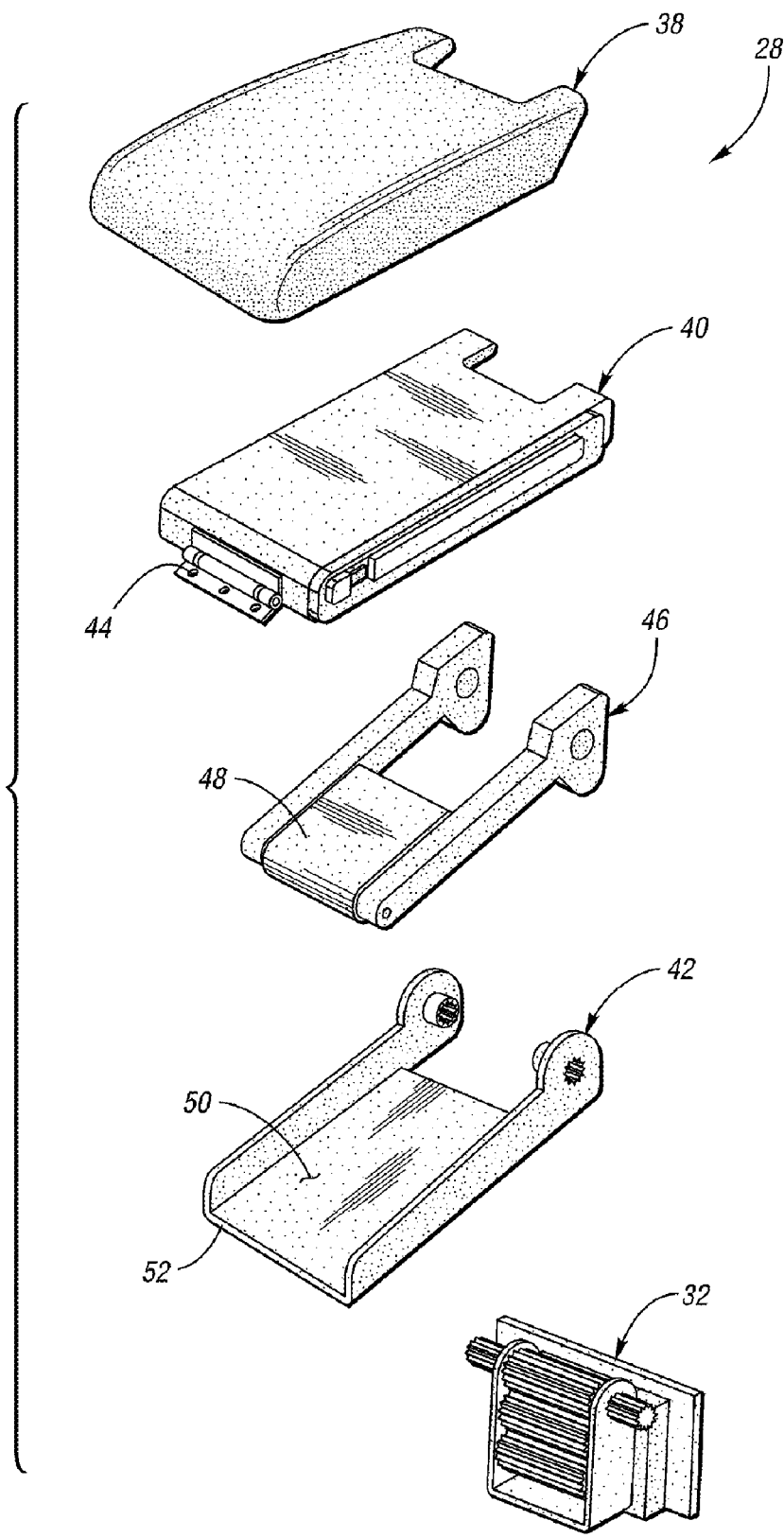

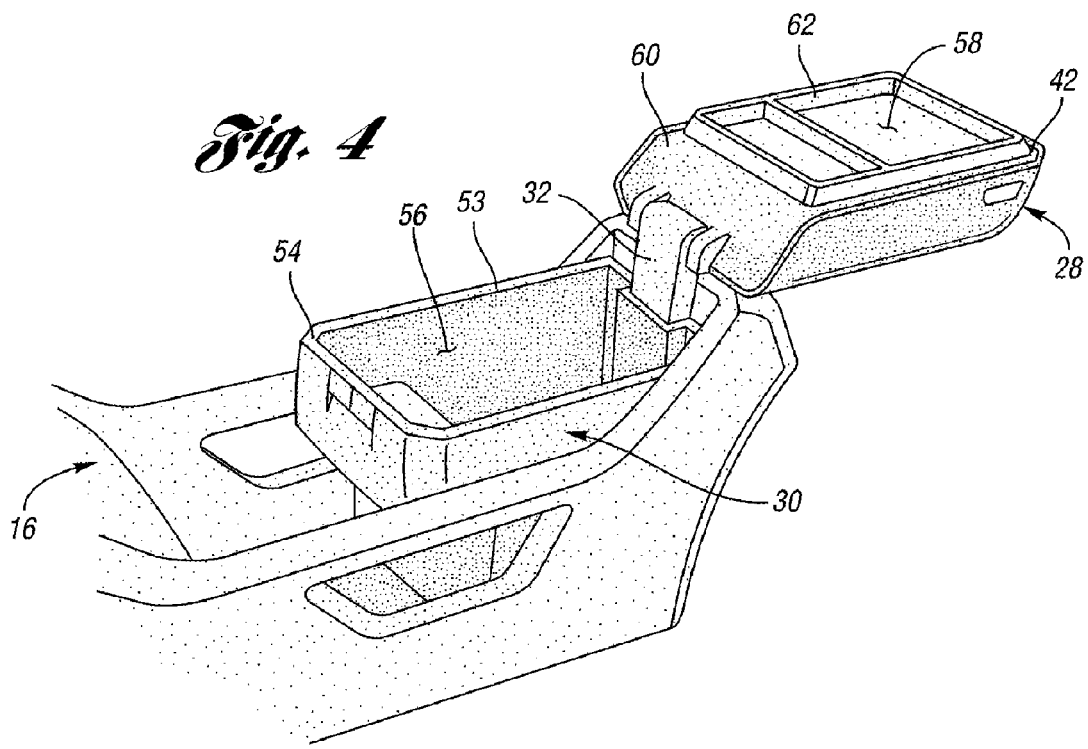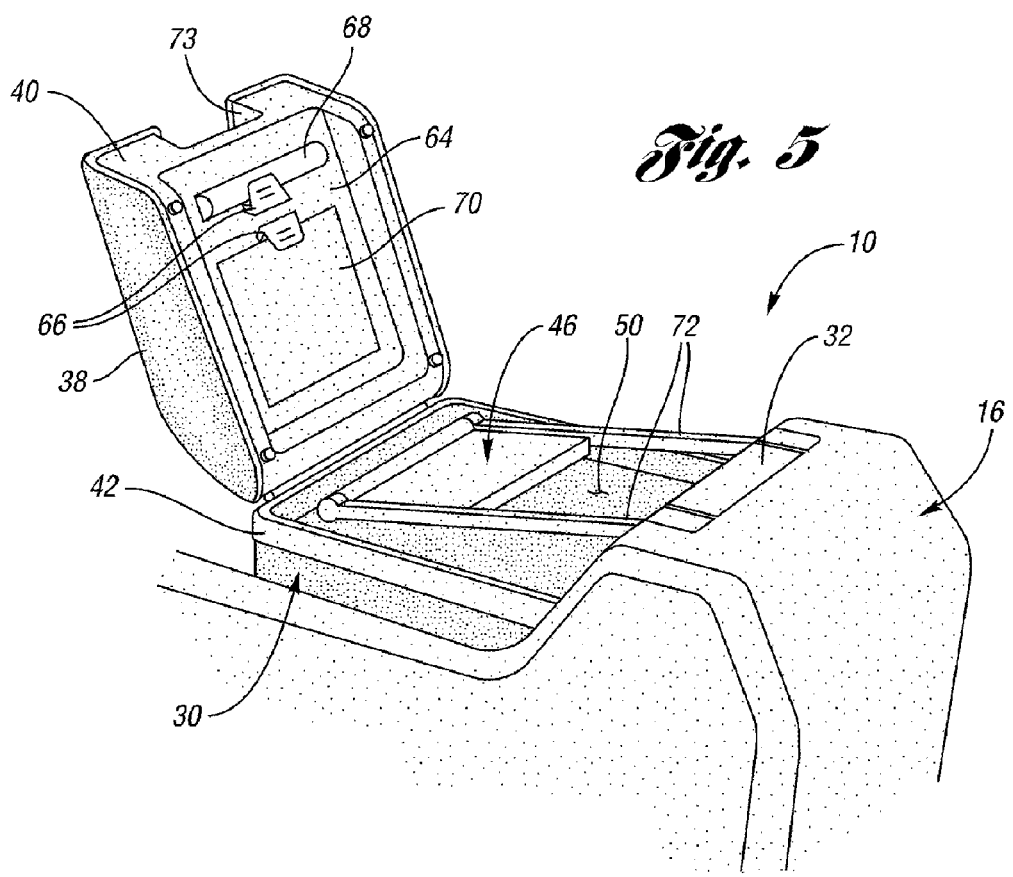

CONSOLE ASSEMBLY FOR A VEHICLE

BACKGROUND OF THE INVENTION

1. Field of the Invention

The present invention relates generally to a console assembly for a passenger seating area of a vehicle.

2. Background Art

Vehicle manufacturers continue to develop storage containers and devices for the passenger compartments of vehicles to accommodate occupant's personal items and automotive components. Several current storage containers are designed to fit within specified areas of the passenger compartment and allow limited access to items stored therein.

Many automotive vehicles include a center console or other storage device disposed between the driver and passenger seats in the front passenger compartment of the vehicle. These consoles typically comprise a console base either secured to the floor or pivotally connected between the seats, a storage cavity formed in the console base to retain items during travel and an armrest pivotally connected to the console base extending generally horizontally across the storage cavity.

Armrests are incorporated into vehicles for ergonomic reasons and comfort and convenience of both drivers and passengers. Armrests may be attached to or integrally formed as part of an interior door panel, a seat assembly, an overhead console, a center console, an instrument panel, a floor system, or any other interior panel.

It is desirable to make console assemblies reconfigurable by integrating various components in a storage area below an armrest. However, many of these components are limited in use to passengers seated in distinct positions of the passenger seating area. It would be advantageous to provide a console assembly having a reconfigurable component usable throughout the vehicle seating area.

SUMMARY OF THE INVENTION

The present invention provides a console assembly for use in a passenger seating area of a vehicle. The console assembly comprises a console housing configured for installment in the passenger seating area. The console housing includes base securable to a vehicle floor, a front surface, opposing side surfaces, a rear surface and a storage area defined therein. A storage module is disposed in the console housing adjacent the storage area.

An armrest is pivotally connected to the console housing movable between a first position extending at least partially over a top surface of the console housing and at least one second position. The armrest includes a closeout section, a receiving portion operatively connected to the closeout section and a console lid slidably connected to the receiving portion.

A console accessory tray is adjustably positioned adjacent the console housing between a stored position and a deployed position extending rearward of the console housing. The console accessory tray includes a display surface accessible to occupants in a rear portion of the passenger seating area. The display surface includes a spring clip and stop adapted to receive a portable media player.

Other features and advantages of the present invention will be readily appreciated and better understood after reading the subsequent description when considered in connection with the accompanying drawings.

BRIEF DESCRIPTION OF THE DRAWINGS

FIG. 3 is an exploded perspective view of an armrest configured for use in connection with the console assembly;

FIG. 4 is a front perspective view of the console assembly of the present invention with the armrest positioned away from the storage module;

FIG. 5 is a front perspective view of the console assembly with the console lid and receiving portion rotated forward of the closeout section in accordance with the present invention;

DETAILED DESCRIPTION OF THE PREFERRED EMBODIMENT(S)

Figure 1:
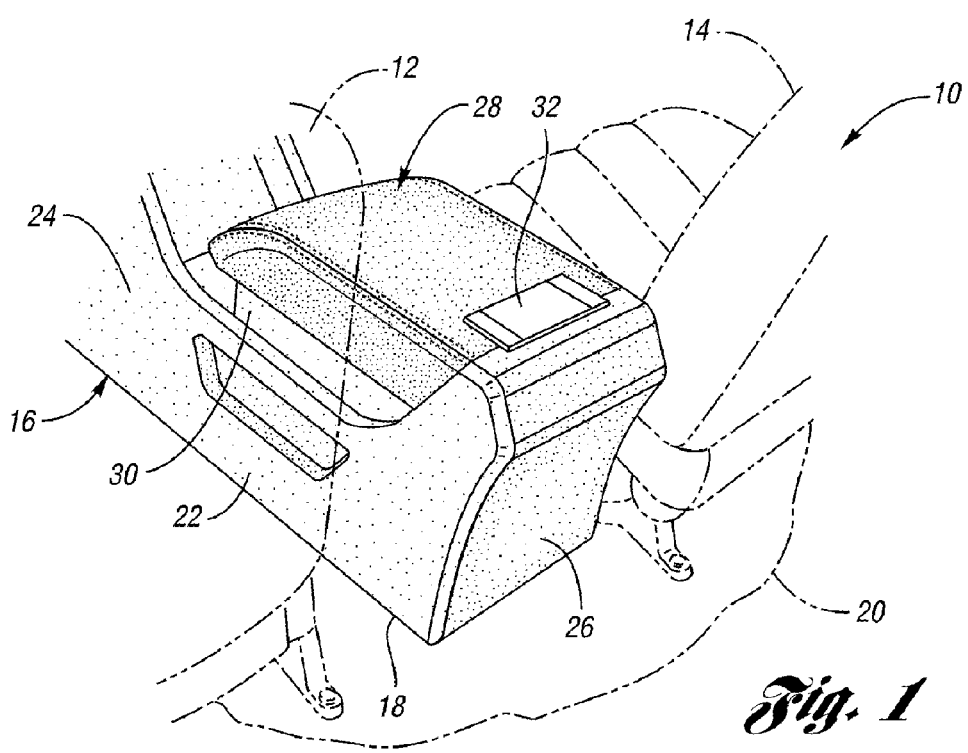
FIG. 1 is a rear perspective view of a console assembly for a passenger seating area of a vehicle in accordance with the present invention.

Referring now to the Figures, a console assembly for use in the passenger seating area of a motor vehicle in accordance with the present invention is disclosed. It is understood that the restraint system may be used in either the front or rear passenger seating areas. For purposes of this disclosure, the restraint system will be installed in the front passenger seating area.

In the following description, various operating parameters and components are described for a number of constructed embodiments. These specific parameters and components are included as examples and are not meant to be limiting.

Console assembly 10 disposed between a pair of passenger seats 12, 14 in the passenger compartment of the vehicle. Console assembly 10 includes a console housing 16 having a base 18 configured to secure the console assembly 10 to the floor 20 of the passenger seating area of the vehicle. The base of console housing may also be connected to one or more vehicle seats. A pair of side surfaces 22 extend generally upward from base 18 and are preferably disposed adjacent the pair of passenger seats 12, 14. It is understood that the console housing may be positioned anywhere within the passenger seating area of the vehicle.

Console housing 16 further includes a front surface 24 disposed generally adjacent a dashboard (not shown) or other forward portion of the vehicle and an opposing rear surface 26 accessible by occupants in a rear passenger seating area of the vehicle. The console housing 16 may also include a variety of storage compartments or areas, such as storage bins or cup holders, formed on an external portion of the console housing.

An armrest 28 is adjustably positioned relative to the console housing 16. Armrest 28 and storage module 30 may also be referred to as a storage assembly. In a preferred embodiment of the present invention, armrest 28 is pivotally connected to a storage module 30 by a hinge 32. Armrest 28 is positionable between a stowed position disposed at least partially adjacent a top surface of the storage module 30 and a deployed position wherein the armrest is rotated 180 degrees rearward relative to the console housing 16 toward a rear passenger seating area of the vehicle. A storage area 36 is provided forward of storage module 30 in console housing 16 for receiving and storing large items, such as purses, bags or the like.

Figure 2:
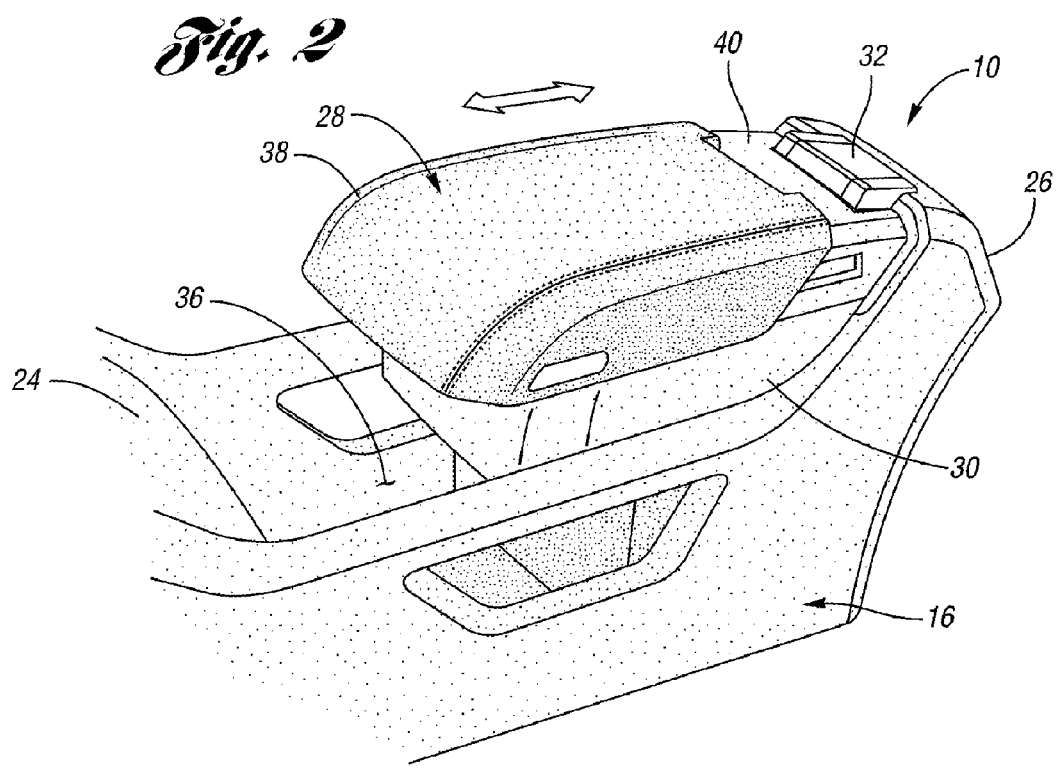
FIG. 2 is a front perspective view of the console assembly.

Referring now to FIGS. 2 and 3, a description of armrest 28 is discussed in greater detail. Armrest 28 includes a console lid 38 slidably connected to a receiving portion 40. Receiving portion 40 allows console lid 30 to be adjusted forward and rearward relative to the console housing by the occupants of the passenger seating area to accommodate a significant range of driver and passenger seating positions. Receiving portion 40 is operatively connected to a lower portion or closeout section 42 by a hinge or bracket 44.

Bracket 44 allows console lid 38 and receiving portion 40 to rotate forward relative to the closeout section 42 and console housing 16 as illustrated in FIG. 5. It should also be understood that the console lid and receiving portion may be hinged to the front, rear or sides of the closeout section, allowing the console lid to pivot a number of directions based on design and aesthetic requirements. A latch (not shown) releasably secures receiving portion 40 to closeout section 42.

Referring again to FIG. 3, a console accessory tray 46 having a presentation or display surface 48 is provided with armrest 28 and is pivotally connected to hinge 32. Accessory tray 46 is designed to fit within a storage area 50 defined in an upper surface 52 of closeout section 42 when placed in a stowed position below receiving portion 40. A more detailed description of the use of the accessory arm 46 with console assembly 10 is provided below.

Referring additionally to FIG. 4, hinge 32 is configured to allow armrest 28 to rotate from a first position adjacent storage module 30 to at least a second position up to 180 degrees from the first position. Hinge 32 is preferably a rising hinge mechanism, as disclosed in U.S. patent application Ser. No. 10/907,542, filed Apr. 5, 2005, entitled "Rising Hinge System with Compartment Lid," which is hereby incorporated by reference.

In the first or stowed position illustrated in FIG. 1, armrest 28 extends at least partially over an opening 53 in a top surface 54 in the storage module housing 30. Opening 53 communicates with a storage compartment 56 formed in storage module housing 40 extending below the top surface 54 of the module housing 30. Storage compartment 56 may include a cavity configured to receive and secure a variety of passenger personal items, such as purses, cell phones or sunglasses. It is also contemplated that vehicle components, such as garage door openers, media components and the like may be positioned within the storage compartment.

In the at least one second or deployed position shown in FIG. 4, armrest 28 is pivoted 180 degrees from the stowed position about hinge 32 rearward relative to the console housing 16 towards a rear passenger seating area. In this position, storage compartment 56 is freely accessible to the occupants of the front passenger seating area. A utility area 58 is formed in the bottom surface 60 of the closeout section to provide additional storage and work space for occupants in the rear seating area. In one aspect of the present invention, utility area 58 includes a ribbed storage area 62 configured to retain materials therein.

As illustrated in FIG. 5, console lid 38 and receiving portion 40 are pivoted forward relative to the console housing 16 about the bracket hinge. In one aspect of the present invention, a lower surface 64 of receiving portion 40 includes one or more retaining clips 66 retaining a writing utensil 68 and notepad 70. Retaining clips 66 cooperate with lower surface 64 to create a writing surface for the occupant. It is understood that a variety of configurations and accessories may also be positioned on the lower surface of the receiving portion of the armrest.

Figure 6:
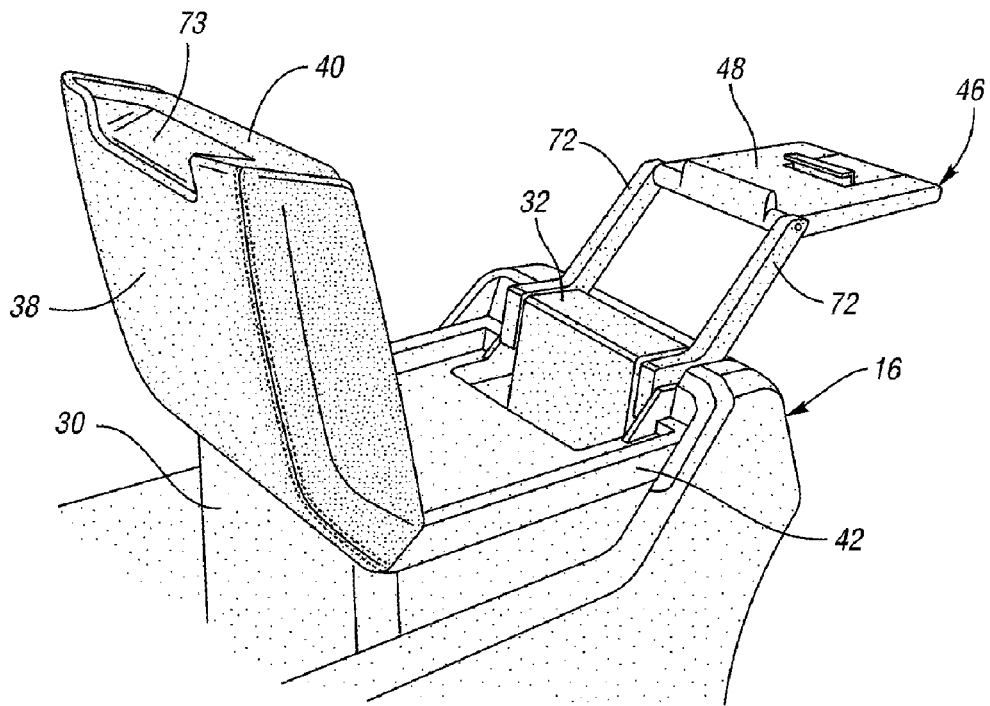
FIG. 6 is a front perspective view of the console assembly with an accessory tray deployed in accordance with the present invention.
Figure 7:
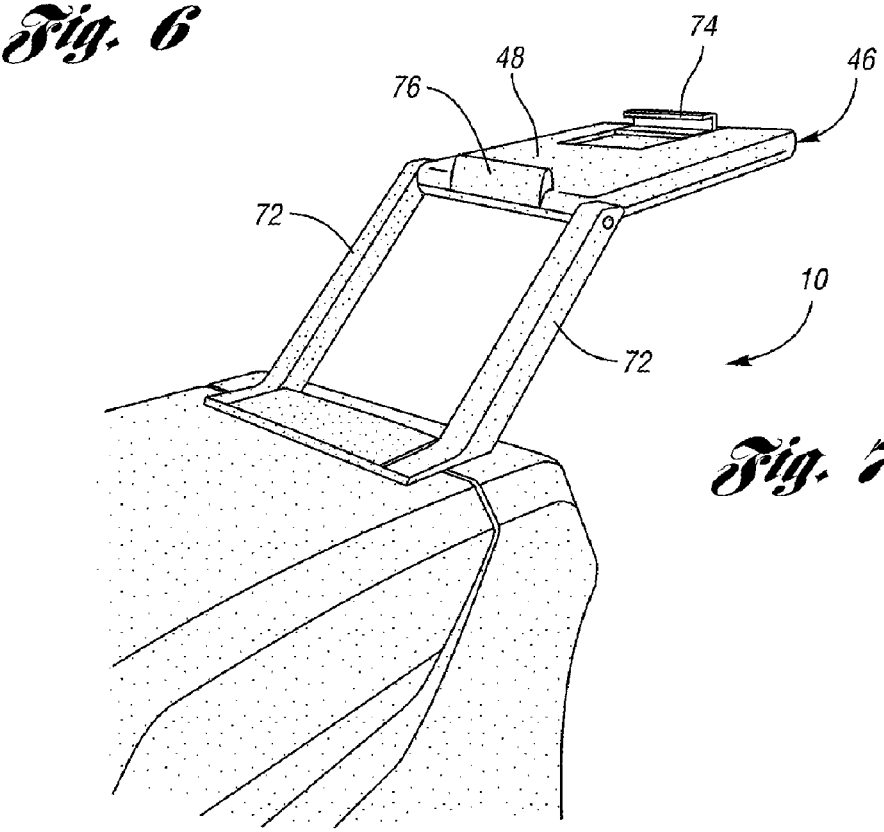
FIG. 7 is a front perspective view of the accessory tray of the console assembly.

Referring now to FIGS. 5-7, the deployment of the console accessory tray of the console assembly of the present invention is described in greater detail. The Figures show, sequentially, the movements required to position the console accessory tray 46 between a stored position and an upright or deployed position for access by occupants of the rear passenger seating area. FIGS. 1 and 2 show the console assembly 10 in the closed or stored position.

In FIG. 5, the console lid 38 and receiving portion 40 are pivoted upward and generally forward relative to the console housing 16 together, exposing console accessory tray 46 stored in closeout section. Console accessory tray 46 includes a pair of opposing arms 72 pivotally connected to and extending from hinge 32 mounted to a rear portion of console housing 16. In the stored position illustrated in FIG. 5, accessory tray 46 is designed to fit within a storage area 50 defined in an upper surface of closeout section 42. Receiving portion 40 at least partially covers the tray 46 when the receiving portion 40 over the closeout section and storage module 30.

Accessory tray 46 rotates about hinge 32 from a stored position adjacent closeout section 42 to a deployed position extending generally rearward of the console housing 16 as shown in FIG. 6. A display or work surface 48 is disposed opposite hinge 32 on arms 72. Display surface 48 is rotatably mounted to arms 72 and is capable of rotating from a stored position adjacent arms 72 to a deployed position.

As shown in FIG. 7, display surface 48 is placed in a substantially horizontal arrangement to allow access by occupants in the rear passenger seating area. Console lid 38 and receiving portion may be pivoted rearward and positioned adjacent storage module 30 when accessory tray 46 is placed in the deployed position. A channel 73 is formed in both console lid 38 and receiving portion 40 to allow arms 72 to extend out from hinge without obstruction.

In one aspect of the present invention, a spring loaded clip 74 is provided on the display surface 48 opposite a stop 76. Clip 74 and stop 76 are configured to receive and secure items, such as a portable media player. Display surface 48 is preferably positioned at a sufficient vertical height to optimize the viewing angle of a portable media player mounted thereon by occupants of the rear seating area.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A console assembly for use with a passenger seating area of a vehicle, the console assembly comprising:
   a console housing configured for installment in the passenger seating area having a storage area defined therein;
   an armrest pivotally connected to the console housing movable between a first position extending at least partially over a top surface of the console housing and at least one second position, the armrest including a closeout section, a receiving portion operatively connected to the closeout section and a console lid slidably connected to the receiving portion; and
   a console accessory tray having a display surface adjustably positionable relative to the console housing configured to receive a portable media player,
   wherein the console accessory tray is positionable between a stored position wherein a storage area defined in an upper surface of the closeout section is configured to receive the console accessory tray and a deployed position extending rearward of the console housing such that the display surface is accessible to occupants in a rear portion of the passenger seating area.

2. The console assembly of claim 1 wherein the console housing is disposed between a pair of front passenger seats in the passenger seating area.

3. The console assembly of claim 1 wherein the console housing includes a base, a front surface, opposing side surfaces, a rear surface defining the storage area of the console housing.

4. The console assembly of claim 1 wherein the console housing further comprises a storage module disposed in the console housing adjacent the storage area.

5. The console assembly of claim 1 wherein the console lid is adjustable on the receiving portion forward and rearward relative to the console housing.

6. The console assembly of claim 1 wherein the receiving portion includes a lower surface having a work space for use by occupants in the passenger seating area of the vehicle.

7. The console assembly of claim 6 wherein the lower surface of the closeout section further comprises a utility area having a ribbed storage surface formed thereon.

8. The console assembly of claim 1 wherein the lower surface of the receiving portion further comprises one or more retaining clips extending from the lower surface configured to receive a writing instrument or paper.

9. The console assembly of claim 1 wherein the display surface includes a spring clip and stop adapted to receive a portable media player.

10. A console assembly disposed between a pair of front passenger seats in a passenger seating area of a vehicle, the console assembly comprising:
    a console housing configured for installment in the passenger seating area having a base, a front surface, opposing side surfaces, a rear surface and a storage area defined therein;
    a storage module disposed in the console housing adjacent the storage area;
    an armrest pivotally connected to the console housing movable between a first position extending at least partially over a top surface of the console housing and at least one second position, the armrest including a closeout section, a receiving portion including a lower surface having a work space for use by occupants in the front passenger seating area operatively connected to the closeout section and a console lid slidably connected to the receiving portion; and
    a console accessory tray having a display surface adjustably positionable relative to the console housing configured to receive a portable media player,
    wherein the console accessory tray is positionable between a stored position and a deployed position extending rearward of the console housing such that the display surface is accessible to occupants in a rear portion of the passenger seating area.

11. The console assembly of claim 10 wherein the console lid is adjustable on the receiving portion forward and rearward relative to the console housing.

12. The console assembly of claim 10 wherein the closeout section further comprises a storage area defined in an upper surface configured to receive the console accessory tray.

13. The console assembly of claim 10 wherein the display surface includes a spring clip and stop adapted to secure the portable media player.

14. A storage assembly configured for use in a console assembly in a passenger seating area of a vehicle, the storage assembly comprising:
    a storage module disposed in the console assembly;
    an armrest pivotally connected to the storage module movable between a first position extending at least partially over a top surface of the console housing and at least one second position, the armrest having
    a closeout section extending at least partially across a top surface of the storage module,
    a receiving portion operatively connected to the closeout section, and
    a console lid slidably connected to the receiving portion adjustable forward and rearward relative to the storage module; and
    a console accessory tray having a display surface adjustably positionable relative to the storage module positionable between a stored position and a deployed position extending rearward of the console assembly such that the display surface is accessible to occupants in a rear portion of a passenger seating area,
    wherein the closeout section further comprises a storage area defined in an upper surface configured to receive the console accessory tray.

15. The storage assembly of claim 14 wherein the display surface includes a spring clip and stop adapted to receive a portable media player.

16. The console assembly of claim 14 wherein the lower surface of the closeout section further comprises a utility area having a ribbed storage surface formed thereon.

* * * * *